Patented Apr. 17, 1951

2,548,884

UNITED STATES PATENT OFFICE 2,548,884

REMOTE POSITIONAL CONTROL MECHANISM

William C. Hartman, Bohemia, James A. Peoples, Jr., Hempstead, and Harvard L. Hull, East Williston, N. Y., assignors to the Sperry Corporation, a corporation of Delaware Application November 1, 1941, Serial No. 417,580

6 Claims. (Cl. 89—41)

The present invention relates to the art including remotely controlled power-operated gun turrets for aircraft.

Up to the present time, aircraft have been provided with armament only in the form of direct manually controlled guns or direct power-operated guns under the immediate control of a gunner positioned at the gun position. For purposes of effective arming of aircraft, it is desirable to place guns in remote positions, such as the tail, the wings, the nose or the fuselage of aircraft, where perhaps stability and weight requirements prohibit the locating of a gunner. The present invention provides improved devices for controlling a remotely situated aircraft gun turret in accordance with gun control data transmitted thereto from a sighting station which may be located anywhere on the craft.

It is accordingly an object of the present invention to provide gun turrets for aircraft and actuating mechanism therefor which may be located at remote positions on the aircraft inaccessible to human gunners.

It is a further object of the present invention to provide remotely operated gun turrets for aircraft which may be controlled from any suitable point on the aircraft.

It is another object of the present invention to provide improved hydraulically actuated and electrically controlled remote gun turrets for aircraft.

It is still another object of the present invention to provide improved remote electro-hydraulically operated gun turrets for aircraft, in which guns are mounted within the turret for rotation in elevation and the turret carries the guns around in azimuth.

It is still another object of the present invention to provide an improved control circuit and mechanism for controlling power-operated gun turrets from a remote position.

It is still a further object of the present invention to provide an improved electrical control circuit for hydraulically actuated gun turrets, which is rapid in response and which may be accurately positioned from a remote point without undue hunting or overshooting.

Further objects and advantages of the present invention will become apparent upon examination of the following specification and drawings, wherein the invention is illustrated in concrete form. For instance, while our remote positional control system is described herein for use in controlling gun turrets, it is obvious that it has application to the positional control of any ponderable object, which it is desired to accurately position from a distance without hunting or overshooting.

Referring to the drawings.

Figure 1:
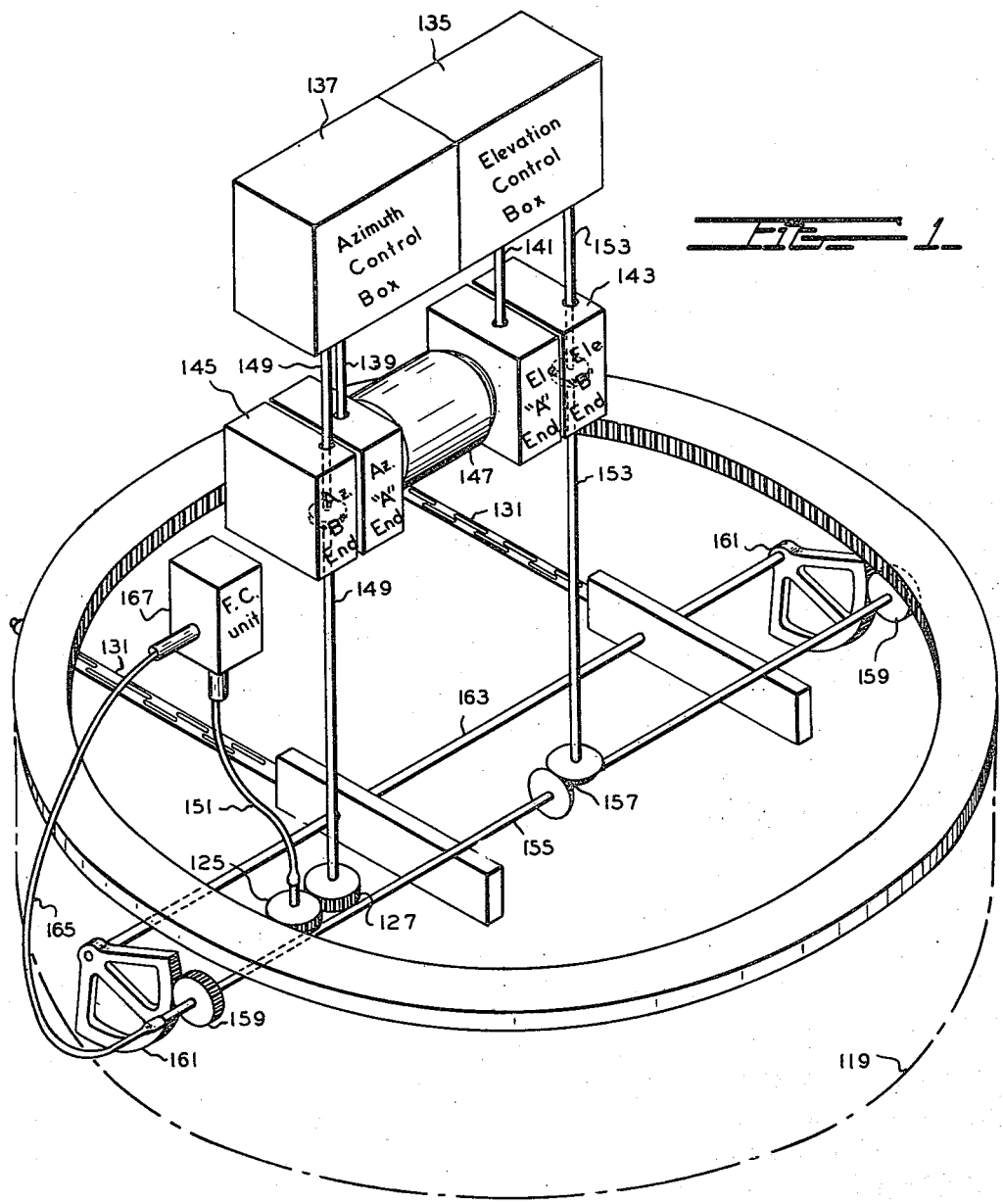
Fig. 1 shows a schematic perspective view of the hydraulically actuated mechanism for driving the guns and turret.

Fig. 1 shows schematically the driving mechanism for a turret 119 carrying guns 131. The actual construction of turret 119 may be similar to that shown in Figs. 2 and 3 or Figs. 6 and 7 of copending application Serial No. 416,290, filed October 24, 1941, in the name of C. G. Holschuh and L. C. Warner, now Patent No. 2,434,653. The turret of the present invention is shown for illustrative purposes only as being a lower turret mountable below the fuselage of the aircraft. However, the control mechanism of the invention is suitable for use with any type of turret, such as a tail turret, wing turret, upper turret, nose turret, etc.

Figure 2:
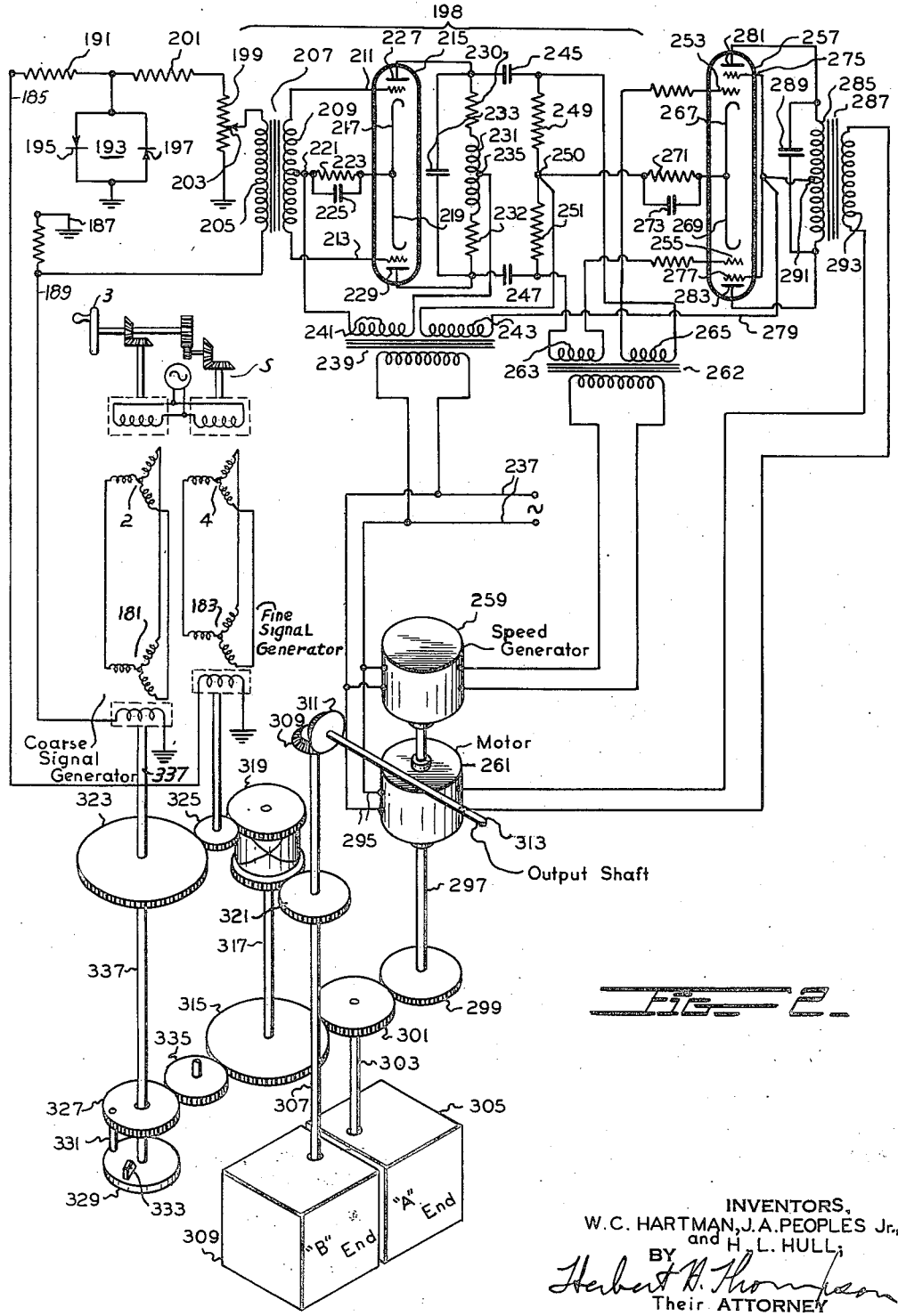
Fig. 2 shows a schematic representation of the electronic and mechanical control for the hydraulic power unit of Fig. 1.

Provided within turret 119 and carried with it are two variable speed hydraulic transmission units 143 and 145 of the well-known Vickers or tilt block type shown as being driven by a common electric motor 147. An example of such units is shown in the patent to D. R. Francis No. 1,767,788, dated June 24, 1930, illustrating a hydraulic "A" end 21 driven by an electric motor 35 and the output of the "A" end driving at variable speed the "B" end 18. The stroke rod or shaft 39 in this patent corresponds to applicants' stroke rod or shaft 303. The A-end or input of azimuth unit 145 is controlled by the azimuth control box 137, and the A-end of elevation unit 143 is controlled by the elevation control box 135, each of these control boxes being as shown in Fig. 2 and described below. These control boxes serve to position their respective A-ends in accordance with data transmitted electrically from a remote fire control position having gun sight computers.

Considering first the turret azimuth control, the output shaft 149 of the azimuth hydraulic unit has its velocity controlled by the position of shaft 139 and therefore by the position of the remote computer-sight in azimuth. Shaft 149 drives the azimuth pinion 125 through a gear 127. Azimuth pinion 125 engages an internal azimuth gear 126 fixed to the craft, and thereby causes the turret 119 to rotate in azimuth at a velocity depending upon the position of the remote computer-sight.

Also coupled to azimuth pinion 125 as by a flexible shaft 151, is the input to a fire cut-off unit 167 which may be of the type described in Fig. 5 of above-mentioned Patent No. 2,434,653.

The output shaft 153 of the elevation hydraulic unit 143 serves to rotate a shaft 155 through gearing 157. Connected to shaft 155 are pinions 159 which engage gear sectors 161 and thereby rotate a shaft 163 upon which guns 131 are rigidly mounted.

Thus, the elevation control of the gun sight-computer at the remote sighting station serves to position input shaft 141 of the elevation hydraulic unit 143 and thereby controls the speed of rotation of shaft 153 and of guns 131 in elevation. Also coupled to shaft 155, as by flexible shaft 165, is the elevation input to the fire cut-off unit 167.

It will therefore be seen that the guns and turret rotate together in azimuth, while the guns rotate independently of the turret in elevation, under the control of the fire control officer at the remote sighting station.

Fig. 2 shows a schematic representation of the control mechanism suitable for use in either the elevation control box 135 or the azimuth control box 137 in Fig. 1. This control mechanism is adapted to be controlled from a remote fire control sighting station. The transmitters at the sighting station S are represented as of the Selsyn type. Coarse and fine transmitters 2 and 3 are shown turned 1 to 1 and at multiple speed respectively from the sight rotating handle 3. The single phase windings of each are excited from a common source and the polyphase windings are connected through data wires 121 to like polyphase windings on coarse and fine Selsyn receivers 181, 183 which act as signal generators, i. e., their output signals from their single phase windings as obtained between wire 185 and ground 187 or wire 189 and ground 187, respectively, are alternating voltages proportional in magnitude to the relative displacement between the remote transmitters 2 and 4 and the corresponding receivers 181 and 183, and correspond in phase to the sense of this relative displacement. As will be shown, these signals represent the relative displacement between actual gun (or turret) position (in azimuth or elevation) and desired gun (or turret) position, modified by a component proportional to the actual gun (or turret) velocity, which provides a corrective factor to prevent overshooting or lag.

These signal voltages are applied to the input of an amplifier and modifying circuit 198, whose output, as will be described, controls a motor 261 serving to actuate the velocity control of the gun, illustrated in this case as being the A-end 305 of a variable-speed hydraulic transmission unit of the well-known Vickers type. This unit may be either unit 135 or unit 137 of Fig. 1.

The output of the "fine" receiver 183, obtained from wire 185 and ground 187, is connected through a resistance 191 to a voltage limiting device 193 shown in this instance as formed of a pair of non-linear conducting elements 195 and 197 connected back-to-back. As has been explained in the prior copending Moseley application Serial No. 41,851, filed September 24, 1935, now Patent No. 2,414,384, these devices may be selenium resistors or copper oxide rectifiers, and serve to yield an alternating voltage output which, for a restricted range, is substantially proportional to the voltage input, while above this restricted range, the voltage output is substantially constant. The purpose of this combination of fixed resistor 191 and the effective non-linear resistor composed of rectifiers 195 and 197 is to limit the output amplitude wave of the fine signal generator 193 for angular deviations of the rotor thereof of the order of 200° to 340° from angular agreement with the fine transmitter rotor. This is to permit the fine signal generator to deliver a steeply rising output signal upon slight relative deviation of transmitter and signal generator rotors, without introduction of possibility of zero total signal introduced by the combined output of the signal generators into the input transformer 205, at ambiguous positions of the signal generator rotors.

The output of voltage limiter 193 is fed to a potentiometer 199 through a coupling resistor 201, and an adjustable voltage derived from this potentiometer 199 by positioning of its movable arm 203, is connected in series with the voltage derived from the "coarse" receiver by wire 185 and ground 187.

The combined voltage thus obtained passes current through the primary 205 of a coupling transformer 207 having a center-tapped secondary winding 209. Secondary winding 209 is connected in push-pull fashion to the input grids 211 and 213 of a phase sensitive demodulator, shown as comprising a double triode tube 215 whose cathodes 217 and 219 are connected together and to the center-tap 221 of secondary winding 209 by means of a cathode biasing resistor 223 shunted by a bypass condenser 225. Connected between the anodes 227 and 229 of demodulator tube 215 is a center-tapped choke coil 231 shunted by a condenser 233. The internal resistance of choke 231 is indicated by resistors 230 and 232. Additional external resistances may be used if desired. An alternating voltage is impressed between the center-tap 235 of choke coil 231 and the center-tap 221 of secondary winding 209, which voltage is derived from alternating current source 237 by means of a transformer 239 having a plurality of secondary windings 241 and 243, winding 241 being connected to the center-taps 221 and 235 just specified. Source 237 has the same frequency and a fixed phase relation to the source of alternating voltage which energizes the primary windings of the synchronous position transmitters referred to above.

Tube 215 and its accompanying circuit elements thereby serve to rectify the voltage input and provide in its output a reversible-polarity direct voltage and an alternating voltage each corresponding to the sense and magnitude of relative displacement between the transmitters and receivers. In addition, choke 231 serves to provide a time-derivative component of this reversible-polarity direct voltage by virtue of the fact that the voltage across a coil is proportional to the rate of change (time derivative) of its current. The composite voltage thus obtained is applied by means of condensers 245 and 247 and resistors 249 and 251 to the grids 253 and 255 of a modulator tube shown as comprising a second duplex tube 257 also connected in push-pull fashion. Resistance-condenser combinations 249, 245 and 251, 247 serve further to electrically "differentiate" the voltages appearing across choke 231, whereby the voltage applied by them to the grid of tube 257 represents the second order time derivative of the relative displacement of transmitter and receiver, together with components representing the first derivative and the actual relative displacement.

Connected in series with these voltages and grids 253 and 255 of tube 257, are alternating voltages derived from a generator 259 mechanically coupled to and driven by motor 261 driven in turn by the output of tube 257, which latter voltages are transmitted from generator 259 to the grid circuits of modulator tube 257 through a transformer 262 having two secondary windings 263 and 265 connected respectively in series with each of grids 253 and 255. The cathodes 267 and 269 of tube 257 are connected together and to the junction 250 of resistors 249 and 251 by means of a cathode biasing resistor 271 shunted by bypass condenser 273.

As will be described below, the position of motor 261 is proportional to the gun (or turret) speed. Hence, the voltage output of generator 259, being proportional to the speed of motor 261, is thereby proportional to the rate of change of gun (or turret) speed, or to gun (or turret) acceleration. Grids 253 and 255 of tube 257 are therefore energized by a composite signal having components proportional to the relative displacement between the synchronous positional transmitters and synchronous receivers which act as signal generators, to the rate of change of this relative displacement, to the second time-derivative of this displacement and to the gun (or turret) acceleration.

Modulator tube 257 is indicated as being a duplex tetrode and its screen grids 275 and 277 are connected together and to one terminal of secondary winding 243 as by means of conductor 279. The other terminal of secondary winding 243 is connected to the junction 250 of resistors 249 and 251. Anodes 281 and 283 of modulator tube 257 are connected together by the primary winding 285 of the output transformer 287, which winding is shunted by a condenser 289. The center-tap 291 of the primary winding 285 is connected directly to the screen grids 275 and 277.

In this way, modulator tube 257 is energized from source 237 and acts to provide in its output a modulated reversible phase alternating voltage whose amplitude is proportional to the combined signal referred to above. This output voltage appears across secondary winding 293 of transformer 287 and serves to control motor 261, which may be of the two-phase type, one phase being energized from output transformer 287, the second phase being energized from source 237 over wires 295. Preferably the output transformer 287 is chosen so that the motor impedance serves as a matched load impedance to tube 257.

Although tubes 215 and 257 have been indicated as being of the duplex type, it will be clear that two individual tubes may be used in place of each of these duplex tubes. Also, these tubes need not necessarily be triodes or tetrodes, as indicated, but may be any form of amplifying electron discharge tube, such as triodes, tetrodes, pentodes, etc.

Motor 261 is directly coupled, as by shaft 297, gears 299, 301 and shaft 303 to the control or A-end 305 of the variable speed hydraulic transmission. As is known, the positioning of the control shaft 303 of the A-end serves to proportionally control the speed of rotation of the output shaft 307 of the output or B-end 309. Shaft 307 is then coupled, as by bevel gears 309 and 311, to an output shaft 313 which goes to control the gun (or turret) in azimuth or elevation, depending upon the use to which this control unit is put.

At the same time motor 261 acts through shaft 297, gears 299, 301 and 315 and shaft 317 to control one member of a differential 319. A second member of this differential 319 is controlled from shaft 307 as by gear 321, and the output of differential 319, which represents a combination of the motions of shafts 317 and 307, acts through gears 323 and 325 to reposition the rotors of the "fine" and "coarse" receivers 181, 183 to, in effect, wipe out the signal that is created in them and thus serve as a repeat-back.

Since the position of shaft 307 represents gun (or turret) position (in elevation or azimuth) and that of shaft 303 represents corresponding gun (or turret) velocity, it will be clear that the repositioning of the rotors of receivers 183, 185 is proportional to gun (or turret) position compensated by a component proportional to gun (or turret) velocity which acts to give positive, accurate, and anti-hunt control at all times.

In operation, the data transmitted from the remote sighting station correspond to the desired gun (or turret) position, in elevation or azimuth, as the case might be. This data is connected to the signal generators 181, 183 whose output is then an alternating voltage roughly proportional in magnitude to the relative displacement between actual and desired gun (or turret) positions, modified and compensated by a component proportional to the actual gun (or turret) velocity. The phase of this signal corresponds to the sense of the compensated relative displacement. This signal is half-wave rectified by either the upper or lower section of demodulator tube 215, the particular section depending upon the phase of the signal relative to the phase of the voltage output of secondary 241.

This rectified signal is transformed by choke 231, condensers 233, 245 and 251 and resistors 230, 232, 249, 251 into a composite signal having components proportional to the compensated signal and first and second order time derivatives thereof.

This composite signal passes through a corresponding section of modulator tube 257 and is there converted into a proportional alternating voltage signal which rotates motor 261 until the repositioning of the rotors of the signal generators wipes out the original signal.

The composite signal is further modified, before going to modulator 257 by a voltage proportional to speed of motor 261 (and therefore proportional to gun or turret acceleration) to provide anti-hunt operation of motor 261.

In addition to these features, this control system may be provided with a limit stop arrangement which will serve to decrease the speed of rotation of the guns (or turret) and finally to stop the guns (or turret) upon reaching a predetermined position in azimuth or elevation, depending upon which quantity is controlled by this control mechanism. This limit stop mechanism is of the same type as that shown in Holschuh and Warner Patent No. 2,434,653, and comprises two relatively rotatable members 327 and 329 carrying, respectively, projections 331 and 333. Member 327 is adapted to be rotated from the A-end 305 of the variable speed unit through shaft 303, gears 301, 315 and 335 and is thereby positioned proportional to gun (or turret) velocity. Member 329, carrying projection 333, is driven from shaft 337 coupled, as by gears 325 and 323, to the output of differential 319, and is thereby positioned proportional to gun (or turret) position compensated by a velocity lead component. In this manner whenever the combination of gun (or turret) position and velocity reaches a predetermined value, projection 331 will be engaged by projection 333, and will then serve to actuate the input shaft 303 of the A-end 305 and thereby reduce the speed of rotation and finally stop the mechanism before the desired limits of travel are exceeded.

It will be clear that this limit stop mechanism automatically compensates itself for gun (or turret) velocity. Thus, with high turret velocity, projection 331 is positioned by the velocity control shaft 303 to be engaged earlier by projection 333 on member 329. Furthermore, projection 333 on member 329 is itself actuated in accordance with gun (or turret) velocity, by way of differential 319, and acts to further anticipate the extreme limit position and to initiate deceleration at an earlier time for higher gun (or turret) velocities.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a remote control system to rotate a controlled object, a data signal source settable relative to the controlled object to produce signals variable in accordance with the disagreement between the actual position and a desired position of the controlled object, a signal generator comprising a polyphase winding and a single-phase winding, one of said windings being rotatable, means to energize the polyphase winding from the data signal source to produce a first signal voltage in the single-phase winding upon disagreement in position between the data signal source and the controlled object, means to modify said first signal voltage to produce a second signal voltage having components proportional to said first signal voltage and to at least one time derivative thereof, a servo motor, means to actuate said motor by the second signal voltage, a variable speed power drive to move the controlled object at variable speed, means to control said speed by said motor, and means to modify the position of the rotatable winding in accordance with the position and velocity of the controlled object.

2. In a positional control system, a source of data signals, a rotatable object, means for rotating said object at variable velocity, means responsive to lack of correspondence between said data signals and the position of said object for producing a signal voltage, means for producing signals corresponding to first and second order time derivatives of said signal voltage, means for producing a signal corresponding to acceleration of said object, means for combining all said produced signals, means for controlling the velocity of said object by said combined signal, and means for reducing said first signal voltage in accordance with the velocity of said object.

3. In a positional control system, a controlled object, a source of data signals corresponding to a desired position of said object, means responsive to lack of correspondence between said data signals and the position of said object for producing a signal voltage, means for producing signal voltage corresponding to at least one time derivative of said first signal voltage, means for producing a signal voltage corresponding to acceleration of said object, means for combining all said produced signals, means for moving said object, means for controlling the velocity of said motive means by said combined signal and differential means for reducing said first signal voltage in accordance with the velocity of said object by displacement of said first means through an angle dependent upon the velocity of said object.

4. In a remote control system, a controlled object, means for moving said object at variable speed, a signal generator for generating a signal in response to lack of correspondence between said object and a desired position of said object, said signal generator including a rotatable portion adapted to be positioned in accordance with the position of said object, means responsive to said signal for adjusting the speed of said object, and means for adjusting the position of said rotatable portion relative to the position of said object in accordance with the speed of said object in a direction to cause a reduction in said signal varying with the speed of said object, whereby as synchronism is approached said signal is cancelled in time to prevent overshooting and hunting.

5. In a remote aircraft turret control system wherein turret control data is transmitted from a remote fire control position, the combination including means for receiving said data, a rotatable turret, means for rotating said turret at variable velocity, means responsive to lack of correspondence between said data and the position of said turret for producing a signal voltage, means for producing at least one time derivative of said signal voltage, means for producing a signal corresponding to acceleration of said turret, means for combining all said signals, and means for controlling the velocity of said turret by said combined signal.

6. In a positional control system, a controlled object, a source of data signals corresponding to a desired position of said object, means responsive to lack of correspondence between said data signals and the position of said object for producing a signal voltage, means for producing signal voltage corresponding to a time derivative of said first signal voltage, means for producing a signal voltage corresponding to acceleration of said object, amplifying means for combining all said produced signals, means for moving said object, means actuated by said amplifying means for controlling the velocity of said motive means by said combined signal, and means for reducing said first signal voltage as the velocity of said object increases.

WILLIAM C. HARTMAN.
JAMES A. PEOPLES, Jr.
HARVARD L. HULL.

REFERENCES CITED

The following references are of record in the file of this patent:

UNITED STATES PATENTS

| Number | Name | Date |
| --- | --- | --- |
| 798,335 | Hall | Aug. 29, 1905 |
| 1,360,664 | Miller | Nov. 30, 1920 |
| 1,375,269 | Akemann | Apr. 19, 1921 |

(Other references on following page)

UNITED STATES PATENTS

| Number | Name | Date |
|---|---|---|
| 1,481,283 | Daniels | Jan. 22, 1924 |
| 1,532,754 | Kaminski | Apr. 7, 1925 |
| 1,951,921 | Blanchard | Mar. 20, 1934 |
| 2,115,086 | Riggs | Apr. 26, 1938 |
| 2,126,910 | Moseley | Aug. 16, 1938 |
| 2,139,558 | Moseley et al. | Dec. 6, 1938 |
| 2,233,415 | Hull | Mar. 4, 1941 |
| 2,284,611 | Barnhart | May 26, 1942 |
| 2,408,068 | Hull et al. | Sept. 24, 1946 |
| 2,414,430 | Nisbet | Jan. 14, 1947 |

FOREIGN PATENTS

| Number | Country | Date |
|---|---|---|
| 350,955 | Great Britain | June 11, 1931 |
| 489,271 | Great Britain | July 22, 1938 |